US009201900B2

(12) United States Patent
Tai

(10) Patent No.: US 9,201,900 B2
(45) Date of Patent: Dec. 1, 2015

(54) RELATED IMAGE SEARCHING METHOD AND USER INTERFACE CONTROLLING METHOD

(71) Applicant: HTC Corporation, Taoyuan, Taoyuan County (TW)

(72) Inventor: Pol-Lin Tai, Taoyuan (TW)

(73) Assignee: HTC CORPORATION, Taoyuan (TW)

( * ) Notice: Subject to any disclaimer, the term of this patent is extended or adjusted under 35 U.S.C. 154(b) by 0 days.

(21) Appl. No.: 14/013,070

(22) Filed: Aug. 29, 2013

(65) Prior Publication Data

US 2015/0063725 A1 Mar. 5, 2015

(51) Int. Cl.
*G06K 9/54* (2006.01)
*G06F 17/30* (2006.01)
*G06K 9/46* (2006.01)
*G06K 9/00* (2006.01)
*G06K 9/20* (2006.01)

(52) U.S. Cl.
CPC .... *G06F 17/30247* (2013.01); *G06F 17/30256* (2013.01); *G06F 17/30268* (2013.01); *G06K 9/00677* (2013.01); *G06K 9/2081* (2013.01); *G06K 9/46* (2013.01); *G06K 9/54* (2013.01)

(58) Field of Classification Search
CPC .............. G06F 17/30876; G06F 17/00; G06F 9/44536; G06F 17/30262; G06F 17/30268; G06K 9/00463; G06K 9/6256; G06K 9/6293; G06K 9/00711; G06K 9/036; G06K 2209/09; G06K 2009/4666; G06K 9/00677; G06K 19/06037; H04N 7/188; H04N 7/185; H04N 1/00005; H01J 37/222; H04W 4/206; G06T 2207/10016; G06T 7/0065; G06T 2207/20092; B60R 21/01552; G01S 15/06; G01S 7/4802; Y10S 707/99945; H05B 37/0272; G08B 13/19645
USPC .......... 382/103, 154, 209, 218, 220, 306, 309
See application file for complete search history.

(56) References Cited

U.S. PATENT DOCUMENTS 5,159,667 A * 10/1992 Borrey et al. .................. 715/205
5,579,471 A * 11/1996 Barber ................ G06F 17/3025
382/209

(Continued)

FOREIGN PATENT DOCUMENTS

TW 200939049 9/2009
TW 201322014 A1 6/2013

OTHER PUBLICATIONS

Office Action issued in corresponding Taiwan application (May 5, 2015).

*Primary Examiner* — Vu Le
*Assistant Examiner* — Aklilu Woldemariam
(74) *Attorney, Agent, or Firm* — McClure, Qualey & Rodack, LLP

(57) ABSTRACT

A related image searching method suitable for searching image files within a database is disclosed. The related image searching method includes steps of: selecting a context-of-interest from a displayed image according to a touch input event; analyzing a content characteristic in the context-of-interest area; determining an implication attribute of the content characteristic; and, searching the database according to the content characteristic and the implication attribute, so as to find out at least one image file with the same content characteristic or the same implication attribute. In addition, a user interface controlling method is also disclosed herein.

16 Claims, 7 Drawing Sheets

(56) References Cited

U.S. PATENT DOCUMENTS

| | | | | |
|---|---|---|---|---|
| 5,684,514 | A * | 11/1997 | Branscomb | G11B 27/034 345/157 |
| 5,819,007 | A * | 10/1998 | Elghazzawi | 706/46 |
| 6,173,076 | B1 * | 1/2001 | Shinoda | 382/226 |
| 6,389,182 | B1 * | 5/2002 | Ihara | G06F 1/1616 235/462.24 |
| 6,453,307 | B1 | 9/2002 | Schapire et al. | 706/12 |
| 6,782,395 | B2 * | 8/2004 | Labelle | G06F 17/30247 |
| 6,850,274 | B1 * | 2/2005 | Silverbrook | B41J 2/14427 348/207.2 |
| 6,961,446 | B2 * | 11/2005 | Imagawa | G11B 27/28 348/14.1 |
| 7,231,082 | B2 * | 6/2007 | Lenoir | G06F 17/243 235/379 |
| 8,001,143 | B1 * | 8/2011 | Gupta | G06F 17/30038 345/614 |
| 8,204,299 | B2 * | 6/2012 | Arcas | G06T 7/0065 382/154 |
| 8,254,684 | B2 | 8/2012 | Raju | |
| 8,396,268 | B2 * | 3/2013 | Zabair et al. | 382/128 |
| 8,589,402 | B1 * | 11/2013 | Iampietro | G06F 17/30268 707/741 |
| 8,731,719 | B2 * | 5/2014 | Franzius et al. | 700/259 |
| 2001/0003182 | A1 * | 6/2001 | Labelle | G06F 17/30247 |
| 2005/0163345 | A1 * | 7/2005 | van den Bergen | G08B 13/19682 382/103 |
| 2006/0215230 | A1 * | 9/2006 | Borrey | H04N 1/40 358/448 |
| 2006/0230006 | A1 * | 10/2006 | Buscema | 706/13 |
| 2008/0069437 | A1 * | 3/2008 | Baker | 382/159 |
| 2008/0152231 | A1 * | 6/2008 | Gokturk | G06F 17/30256 382/209 |
| 2008/0313273 | A1 * | 12/2008 | Wang | H04L 67/16 709/203 |
| 2009/0080698 | A1 * | 3/2009 | Mihara | G06F 17/30784 382/103 |
| 2009/0085772 | A1 * | 4/2009 | Huang et al. | 340/932.2 |
| 2009/0289905 | A1 * | 11/2009 | Ahn | G06F 3/04883 345/173 |
| 2010/0250553 | A1 * | 9/2010 | Higuchi | G06F 17/3028 707/748 |
| 2010/0316295 | A1 * | 12/2010 | Morimoto | G06K 9/00463 382/182 |
| 2011/0025694 | A1 * | 2/2011 | Ptucha | G06T 11/60 345/467 |
| 2011/0025883 | A1 * | 2/2011 | Shkurko | H04N 5/772 348/231.2 |
| 2011/0029540 | A1 * | 2/2011 | Ptucha | G06T 11/60 707/748 |
| 2011/0029553 | A1 * | 2/2011 | Bogart | G06F 17/30265 707/769 |
| 2011/0029635 | A1 * | 2/2011 | Shkurko | G06F 17/248 709/217 |
| 2011/0029860 | A1 * | 2/2011 | Ptucha | G06T 11/60 715/246 |
| 2011/0082824 | A1 * | 4/2011 | Allison et al. | 706/20 |
| 2011/0164126 | A1 * | 7/2011 | Ambor | A61B 1/0005 348/65 |
| 2011/0222782 | A1 * | 9/2011 | Kashiwagi | G06K 9/00711 382/218 |
| 2011/0305377 | A1 * | 12/2011 | Drozdzal | G06T 7/0038 382/128 |
| 2012/0057775 | A1 * | 3/2012 | Suzuki | H04N 5/76 382/154 |
| 2012/0154447 | A1 * | 6/2012 | Kim | G06F 3/04883 345/661 |
| 2012/0246732 | A1 * | 9/2012 | Burton | G06F 17/30787 726/26 |
| 2012/0269436 | A1 * | 10/2012 | Mensink et al. | 382/180 |
| 2012/0284793 | A1 * | 11/2012 | Steinbrecher et al. | 726/23 |
| 2013/0132331 | A1 * | 5/2013 | Kowalczyk et al. | 706/52 |
| 2013/0132361 | A1 | 5/2013 | Chen et al. | |
| 2013/0173533 | A1 * | 7/2013 | Nichols | G06F 17/30035 707/609 |
| 2013/0294646 | A1 * | 11/2013 | Shaw | 382/103 |

\* cited by examiner

RELATED IMAGE SEARCHING METHOD AND USER INTERFACE CONTROLLING METHOD

BACKGROUND

1. Field of Invention

The present disclosure relates to an image searching method. More particularly, the present disclosure relates to an image searching method for dynamically searching related images and a user interface thereof.

2. Description of Related Art

In the modern society, people keep searching efficient solutions to deal with problems in daily life. For example, handheld devices, such as mobile phones, tablet computers or personal digital assistants (PDA), are useful tools with powerful functions, compact sizes and great operability. Furthermore, users look forward to that the devices can intelligently determine which function users tend to launch and accordingly reply related information to users. The intelligent judgment is more important to some common applications, such as viewing photos or videos stored in the mobile phones or tablet computers.

Recently, camera functions implemented in mobile phones or tablet computers has been highly developed, and an entity storage space or a cloud storage space of the mobile phones or the tablet computers is rapidly increased. Therefore, users tend to take pictures with their handheld devices, and also manage/review existed photos (such as searching their individual photos, group photos with their families/friends, photos at a specific location during a trip, and photos with their pets). However, it is usually hard to classify and search existed data on the handheld devices. In order to find an old photo file stored in the handheld devices, the users have to scroll down the screen of the mobile device repeatedly to locate the target file.

On the other hand, display interfaces on the handheld devices are usually smaller than traditional desktop computers. Sizes of the thumbnails are relatively small while the users are searching their target photos, such that it is hard to identify the target file correctly and efficiently from a lot of thumbnails displayed on the compact screen.

SUMMARY

In general, a selection behavior is usually detected by a contact or an induction between a finger/stylus and a touch sensor. In embodiments of this disclosure, users can assign/select contents of their interest by a touch gesture while viewing an image on the electronic device. In response, the electronic device immediately searches a database built in the electronic device and display related images within the database, so as to elevate the efficiency of the electronic device.

An aspect of the disclosure provides a related image searching method suitable for searching a database storing a plurality of image files. The related image searching method includes steps as follows. A context-of-interest (COI) area is selected from a displayed image according to a touch input event. A content characteristic in the COI area is analyzed. An implication attribute of the content characteristic is determined. The database is searched according to the content characteristic and the implication attribute, so as to identify at least one image file from the database with the same content characteristic or the same implication attribute.

According to an embodiment of the disclosure, the related image searching method further includes steps as follows. The image files within the database are analyzed for obtaining a plurality of existed content characteristics of the image files. A plurality of existed content characteristic labels is established according to the existed content characteristics. The existed content characteristic labels respectively corresponding to each of the image files is recorded according to the existed content characteristics within each of the image files.

According to an embodiment of the disclosure, after the step of analyzing the content characteristic in the COI area, the related image searching method further includes steps as follows. Whether the content characteristic matches the existed content characteristics corresponding to the existed content characteristic labels is determined. If the content characteristic matches one of the existed content characteristics, the database is searched according to corresponding one of the existed content characteristic labels, so as to identify at least one image file from the database with the same existed content characteristic label.

According to an embodiment of the disclosure, during the step of selecting the context-of-interest (COI) area according to the touch input event, the touch input event includes a plurality of touch points or a touch track, and the related image searching method further includes steps as follows. A first COI area and a second COI area are selected together from the displayed image according to the touch points or the touch track of the touch input event. A first content characteristic in the first COI area and a second content characteristic in the second COI area are analyzed. A first implication attribute of the first content characteristic and a second implication attribute of the second content characteristic are determined. The database is searched according to a logical set formed by the first content characteristic, the first implication attribute, the second content characteristic and the second implication attribute, so as to identify at least one image file from the database with the same logical set.

According to an embodiment of the disclosure, the logical set is a conjunction set, a disjunction set or a complement set between the first content characteristic, the first implication attribute, the second content characteristic and the second implication attribute.

According to an embodiment of the disclosure, the content characteristic is a specific person, a specific object, a specific location, a specific scene or a specific pet. In aforesaid embodiment, the content characteristic is analyzed by an algorithm combination, and the algorithm combination is selected from the group consisting of a face recognition algorithm, an object recognition algorithm, a scene recognition algorithm and a pet recognition algorithm. In aforesaid embodiment, the implication attribute determined from the content characteristic includes at least one of a character category, an item category, a location category, a background category and a pet category.

According to an embodiment of the disclosure, during the step of searching the database according to the content characteristic and the implication attribute, the related image searching method further includes steps as follows. At least one image file from the database with the same content characteristic is searched preferably. If there is no image file found with the same content characteristic, at least one image file from the database with the same implication attribute is searched.

Another aspect of the disclosure provides a user interface controlling method, which includes steps as follows. A displayed image is shown. A context-of-interest (COI) area is selected from a displayed image according to a touch input event. A content characteristic in the COI area is analyzed. An implication attribute of the content characteristic is determined. The database is searched according to the content characteristic and the implication attribute, so as to identify at least one image file from the database with the same content characteristic or the same implication attribute. The at least one image file is displayed.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Although the present disclosure has been described in considerable detail with reference to certain embodiments thereof, other embodiments are possible. Therefore, the spirit and scope of the appended claims should not be limited to the description of the embodiments contained herein.

Figure 1:
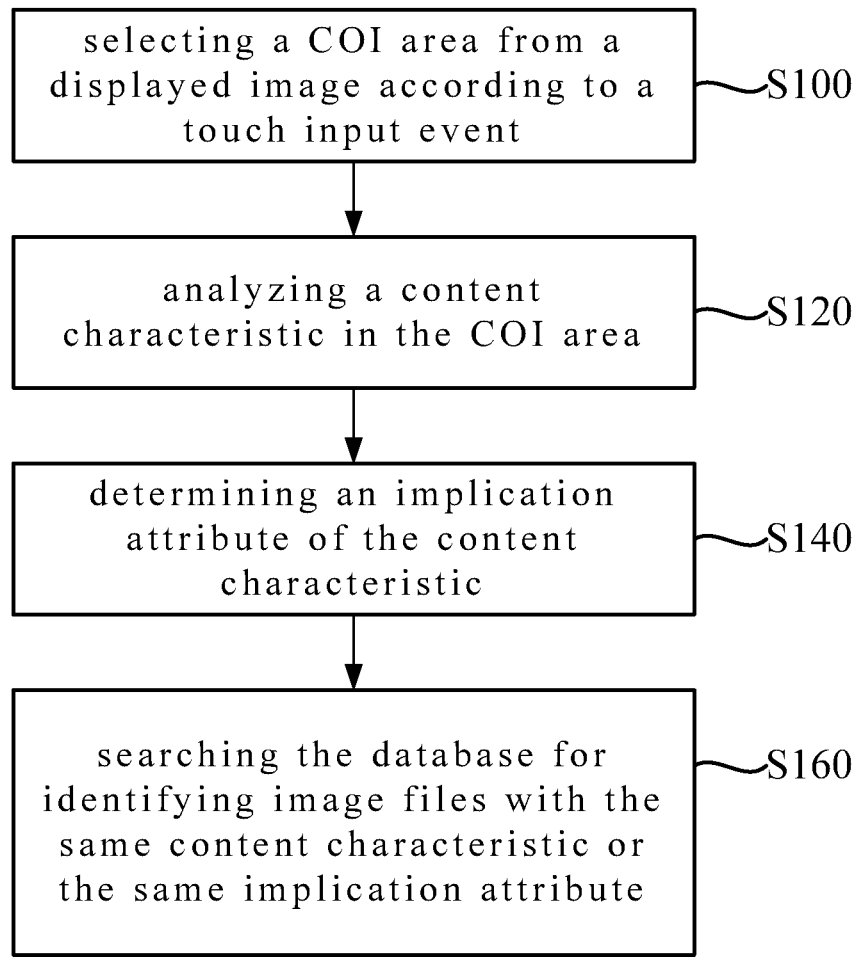
FIG. 1 is a flow diagram illustrating a related image searching method according to an embodiment of the disclosure.

Reference is made to FIG. 1, which is a flow diagram illustrating a related image searching method according to an embodiment of the disclosure. As shown in figure, the related image searching method in this disclosure executes step S100 at first, for selecting a context-of-interest (COI) area from a displayed image according to a touch input event.

Figure 2:
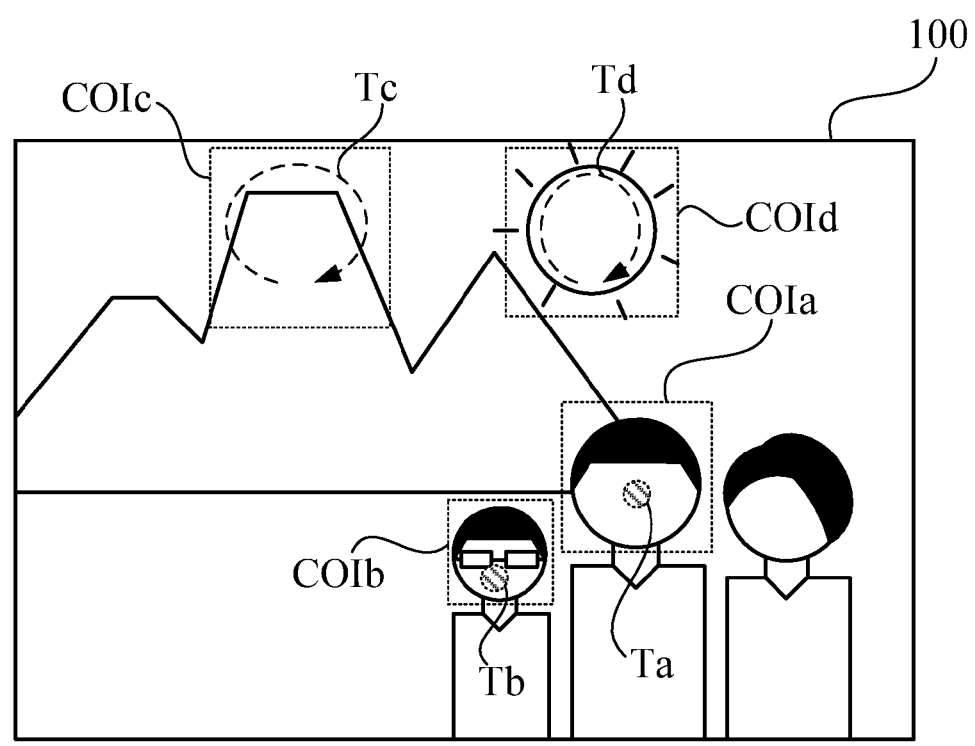
FIG. 2 is a schematic diagram illustrating a displayed image in the practical example.

A practical example is disclosed in following paragraphs for demonstration. Reference is made to FIG. 2, which is a schematic diagram illustrating a displayed image 100 in the practical example. In practical applications, the displayed image 100 can be a screen view displayed on an electronic device. For example, the displayed image 100 can be a screen view, which is displayed when the user just capture a new photo by the electronic device (e.g., by a built-in camera on a mobile phone) or when the user reviews an existed image file stored in a database within the electronic device (e.g., a memory unit within a mobile phone or a cloud storage).

Via a touch input interface (e.g., a Resistive touch sensor, a capacitive touch sensor, an optical touch sensor, or acoustic touch sensor, etc.) on the electronic device, the user can trigger/form a touch input event at a specific location in the area corresponding to the displayed image 100. To form a touch input event at different location related to a screen is a common techniques in conventional touch sensing, so it is not explained further herein.

In the embodiment, the touch input event formed in the area corresponding to the displayed image 100 includes at least one touch point(s) or at least one touch track(s). The touch input event in the practical example illustrated in FIG. 2 includes two touch points (Ta and Tb) and/or two touch tracks (Tc and Td). Step S100 selects a context-of-interest (COI) area (COIa, COIb, COIc or COId) from the displayed image 100 according to the touch input event (Ta, Tb, Tc or Td).

The related image searching method is suitable for searching a database storing multiple image files, so as to identify related image files corresponding to the context-of-interest area COIa, COIb, COIc or COId selected by the user. In other words, the user can dynamically assign a target of interest from the displayed image 100, and the related image searching method will automatically retrieve related image files within the database (e.g., a digital album, a photo data folder, a multimedia data folder or an image storage space within the electronic device).

For example, when the user touches the location at the touch point Ta with his finger, the context-of-interest area COIa is selected from the displayed image 100; when the user touches the location at the touch point Tb with his finger, the context-of-interest area COIb is selected from the displayed image 100, and so forth.

Afterward, the step S120 is executed for analyzing a content characteristic in the context-of-interest area COIa, COIb, COIc or COId. The analyzing in step S120 is achieved by one singular algorithm or a combination of multiple algorithms.

For example, the algorithm for analyzing includes a face recognition algorithm. When the touch input event is the touch point Ta, the context-of-interest area COIa is selected from the displayed image 100, and the content characteristic in the context-of-interest area COIa is a face which belongs to a specific person (e.g., a specific male adult in this practical example shown in FIG. 2). When the touch input event is the touch point Tb, the context-of-interest area COIb is selected from the displayed image 100, and the content characteristic in the context-of-interest area COIb is a face which belongs to another specific person (e.g., a specific kid wearing glasses in this practical example shown in FIG. 2). However, the content characteristic of the context-of-interest area is not limited to a specific person, and the algorithm for analyzing is not limited to a face recognition algorithm.

In some embodiments, the content characteristic is a specific person, a specific object, a specific location, a specific scene or a specific pet. In this case, the analyzing in step S120 is achieved by a combination of multiple algorithms. The algorithm combination is selected from the group consisting of a face recognition algorithm, an object recognition algorithm, a scene recognition algorithm and a pet recognition algorithm.

As the practical example shown in FIG. 2, when the touch input event is the touch point Tc, the context-of-interest area COIc is selected from the displayed image 100, and the content characteristic in the context-of-interest area COIc is a specific location (e.g., a specific mountain in this practical example shown in FIG. 2). When the touch input event is the touch point Td, the context-of-interest area COId is selected from the displayed image 100, and the content characteristic in the context-of-interest area COId is a specific scene (e.g., a sunny scene shown in FIG. 2).

Afterward, step S140 is executed for determining an implication attribute of the content characteristic. In aforesaid step S120, the content characteristic in the context-of-interest area COIa, COIb, COIc or COId is a specific person, a specific item, a specific location, a specific scene or a specific pet. Aforesaid content characteristic is related to a particular object. Step S140 is executed for abstracting the implication attribute (i.e., schematic meaning) of the content characteristic.

For example, the context-of-interest area COIa is analyzed by step S120 as a specific face belong a specific person, and further determined by step S140 to obtain the implication attribute as non-specific male, non-specific adult or non-specific face of any people.

The context-of-interest area COIb is analyzed by step S120 as a specific face belong a specific person, and further determined by step S140 to obtain the implication attribute as non-specific kid, non-specific person wearing glasses or non-specific face of any people.

The context-of-interest area COIc is analyzed by step S120 as a specific face belong a specific location, and further determined by step S140 to obtain the implication attribute as non-specific mountain or non-specific outdoor location.

In other words, the implication attribute determined by step S140 includes at least one of a character category, an item category, a location category, a background category and a pet category.

Afterward, step S160 is executed for searching the database according to the content characteristic and the implication attribute, so as to identify at least one image file from the database with the same content characteristic or the same implication attribute.

Figure 3:
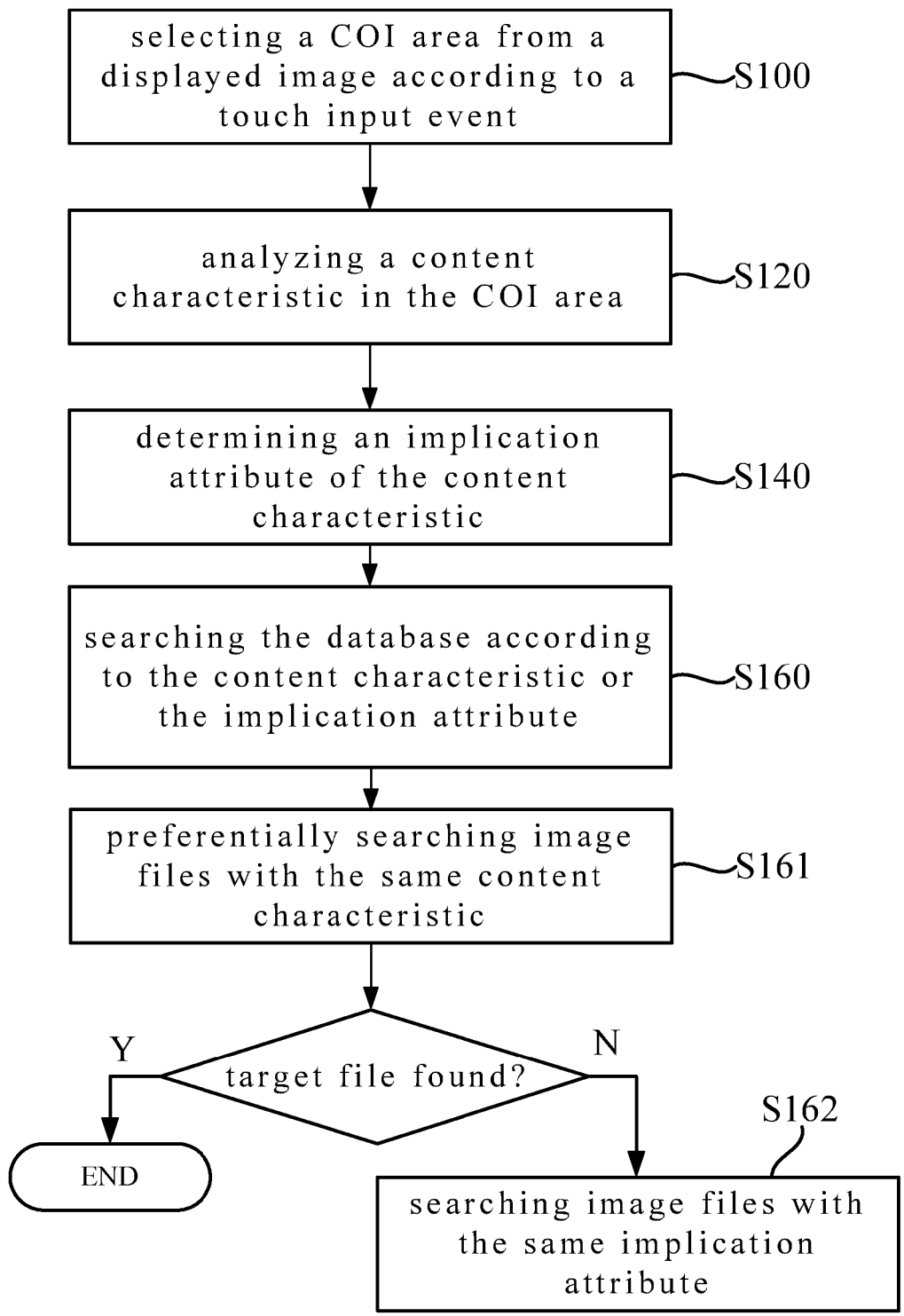
FIG. 3 is a flow diagram illustrating further flows of the related image searching method in FIG. 1 according to an embodiment of this disclosure.

In addition, reference is also made to FIG. 3, which is a flow diagram illustrating further flows of the related image searching method in FIG. 1 according to an embodiment of this disclosure. As shown in FIG. 3, when the related image searching method searches the database according to the content characteristic and the implication attribute, step S161 is executed for preferentially searching at least one image file from the database with the same content characteristic. In an embodiment, if step S161 fails to find any target file, such as fails to find any file with the same content characteristic, the related image searching method goes to step S162. In another embodiment, the user can manually decide whether the target file of interest has been found already in step S161 and selectively activate step S162. In still another embodiment, the step S162 will be executed by default after the step S161.

The image file(s) with the same implication attribute will be identified in step S162. Therefore, image files with high relevance (having the same content characteristic) will be identified at first in the step S161. When the searching result does not reveal the real targets of user's interest, the step 162 is executed for searching in a broaden scope.

Furthermore, aforesaid embodiments and the related image searching method shown in FIG. 1 and FIG. 3 substantially describe an embodiment of searching based on one context-of-interest area selected from the displayed image 100. However, the disclosure is not limited to this. In other embodiments, the touch input event includes multiple touch points or a touch track with large selection area. The multiple touch points or the touch track with large selection area is utilized to select two or more context-of-interest areas at once.

Figure 4:
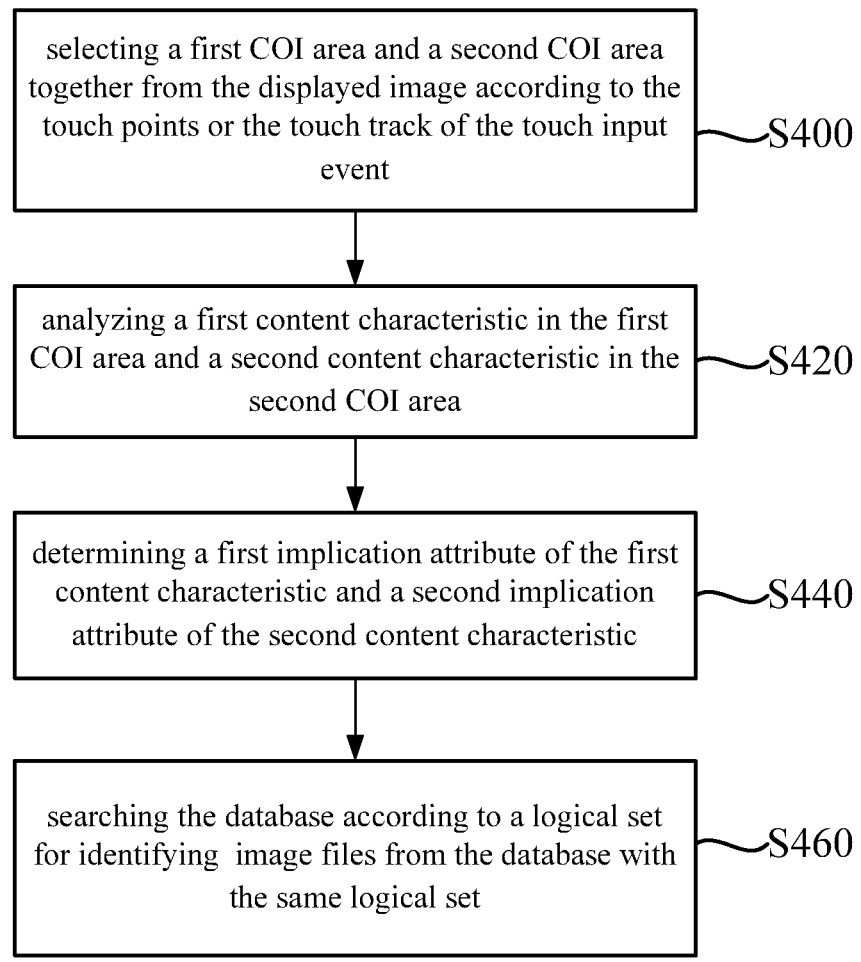
FIG. 4 is a flow diagram illustrating a related image searching method according to another embodiment of the disclosure.
Figure 5:
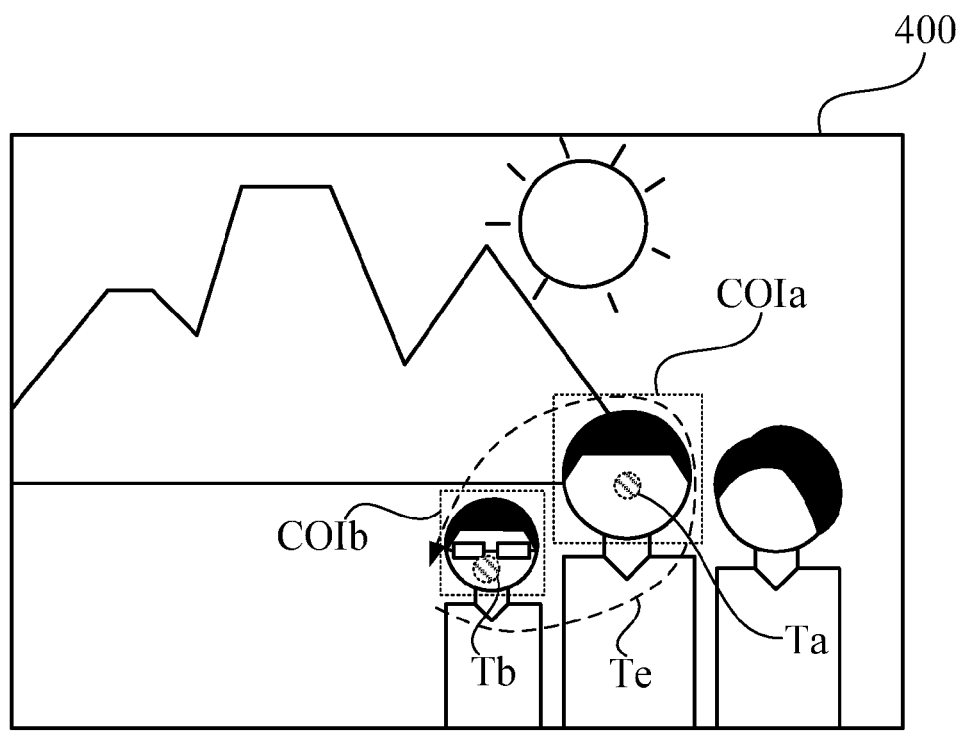
FIG. 5 is a schematic diagram illustrating a displayed image in a practical example.

Reference is made to FIG. 4 and FIG. 5. FIG. 4 is a flow diagram illustrating a related image searching method according to another embodiment of the disclosure. FIG. 5 is a schematic diagram illustrating a displayed image 400 in a practical example. In this embodiment, during a step of selecting a context-of-interest area(s) according to a touch input event, the touch input event includes multiple touch points together (e.g., both of the touch points Ta and Tb in FIG. 5). In this case, step S400 is executed for selecting a first context-of-interest area and a second context-of-interest area together (e.g., the context-of-interest areas COIa and COIb) from the displayed image 400 according to the touch points Ta and Tb.

On the other hand, the touch input event includes a touch track with large selection area (e.g., the touch track Tc in FIG. 5). In this case, step S400 is executed for selecting a first context-of-interest area and a second context-of-interest area together (e.g., the context-of-interest areas COIa and COIb) from the displayed image 400 according to the touch track Tc.

However, the disclosure is not limited to select the context-of-interest areas COIa and COIb. In practical applications, the multiple context-of-interest areas are selected according to user's interests and serve as references/conditions in the following searching.

Afterward, step S420 is executed for analyzing a first content characteristic in the first context-of-interest area and a second content characteristic in the second context-of-interest area. Step S440 is executed for determining a first implication attribute of the first content characteristic and a second implication attribute of the second content characteristic. The behaviors and operations of steps S420 and S440 are similar to steps S120 and S140 in aforesaid embodiments. The main difference is that, there are two (or more than two) context-of-interest areas analyzed and determined in steps S420 and S440.

Afterward, step S460 is executed for searching the database according to a logical set, which is formed by the first content characteristic, the first implication attribute, the second content characteristic and the second implication attribute, so as to identify at least one image file from the database with the same logical set. In this embodiment, the logical set is a conjunction set, a disjunction set or a complement set between the first content characteristic, the first implication attribute, the second content characteristic and the second implication attribute.

For example (referring to FIG. 5), when the first context-of-interest area and the second context-of-interest area are selected to be areas COIa and COIb in FIG. 5. The first content characteristic of the first context-of-interest area COIa is a face of a specific person (e.g., Brian), and the first implication attribute of the first context-of-interest area COIa is non-specific male, non-specific adult or non-specific face of any people. The second content characteristic of the second context-of-interest area COIb is a face of a specific person (e.g., Alex), and the second implication attribute of the second context-of-interest area COIb is non-specific kid, non-specific person wearing glasses or non-specific face of any people.

Step S460 is executed to generate different outcomes by searching the database according to different logical sets (formed by the first content characteristic, the first implication attribute, the second content characteristic and the second implication attribute). For example, the outcomes can be group photos involving Brian and Alex (i.e., a conjunction set between the first content characteristic and the second content characteristic), photos with Brian and without Alex (i.e., a complement set between the first content characteristic and the second content characteristic), photos with Brian or Alex (i.e., a disjunction set between the first content characteristic and the second content characteristic), photos with Brian and non-specific kid (i.e., a conjunction set between the first content characteristic and the second implication attribute), photos with Brian and non-specific person wearing glasses (i.e., a conjunction set between the first content characteristic and the second implication attribute), photos with non-specific male adult and Alex (i.e., a conjunction set between the first implication attribute and the second content characteristic), etc.

Based on aforesaid embodiment, the related image searching method can be utilized to search photos with Brian at a specific location (e.g., a specific mountain), photos with Brian and a specific item, photos with Brian with non-specific female, individual photos of not-specific female. Aforesaid searching results can be achieved by selecting different context-of-interest areas in step S400 and setting different logical sets in step S460.

In addition, the related image searching method disclosed in the embodiments illustrated in FIG. 1, FIG. 3 and FIG. 4 is not limited to compare the content characteristic/implication attribute of the context-of-interest area with the content characteristics/implication attributes of all existed image files stored in the database, because it will occupy a lot of processing time and computation resource.

Figure 6:
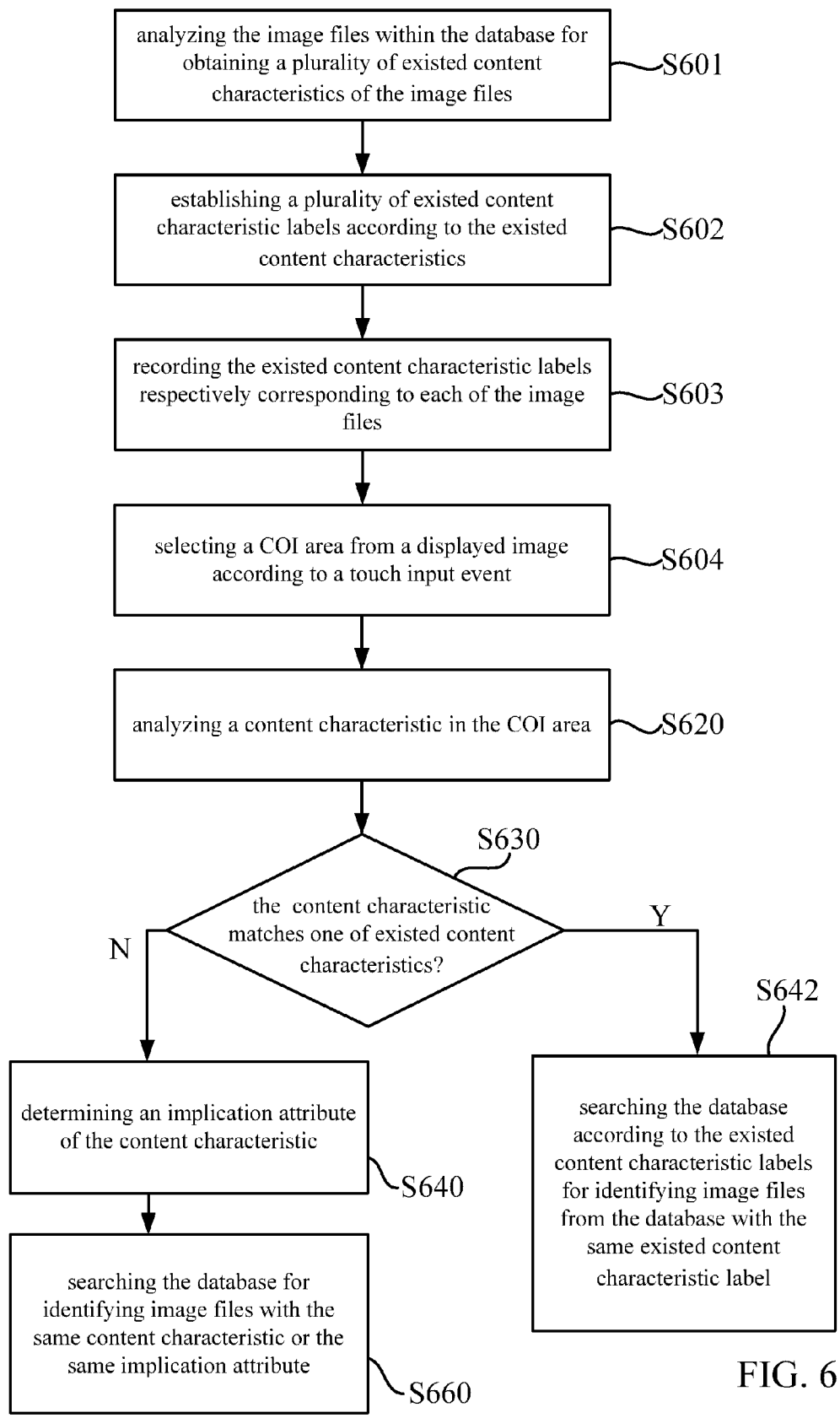
FIG. 6 is a flow diagram illustrating a related image searching method including steps for establishing existed content characteristics according to an embodiment of the disclosure.

Therefore, the related image searching method may further include steps for establishing existed content characteristics. Reference is made to FIG. 6, which is a flow diagram illustrating a related image searching method including steps for establishing existed content characteristics according to an embodiment of the disclosure.

As shown in FIG. 6, the related image searching method disclosed in FIG. 1, FIG. 3 and FIG. 4 further includes step S601 to analyze the image files stored within the database for obtaining a plurality of existed content characteristics of the image files. Afterward, step S602 is executed for establishing a plurality of existed content characteristic labels according to the existed content characteristics. Afterward, step S603 is executed for recording the existed content characteristic labels respectively corresponding to each of the image files, according to the existed content characteristics within each of the image files.

In this case, the existed image files stored within the database have corresponding existed content characteristic labels. Afterward, step S604 is executed for selecting a context-of-interest area from a displayed image according to a touch input event (referring to step S100 or S400 in aforesaid embodiments). Step S620 is executed for analyzing a content characteristic in the context-of-interest area (referring to step S120 or S420 in aforesaid embodiments).

After the content characteristic in the context-of-interest area is analyzed by step S620, step S630 is executed for determining whether the content characteristic matches the existed content characteristics corresponding to the existed content characteristic labels.

If the content characteristic matches one of the existed content characteristic labels in step S630, step S640 is executed for searching the database according to corresponding one of the existed content characteristic labels, so as to identify at least one image file from the database with the same existed content characteristic label.

Therefore, by comparing the content characteristic of the context-of-interest area with the existed content characteristic labels, it avoids a complex computation involving the comparison between all image contents within the database and the content characteristic. The relative image searching method can identify the image files with a corresponding existed content characteristic label as the searching result, so as to reduce computation loadings of image comparing.

On the other hand, if the content characteristic of the context-of-interest area does not match any one of the existed content characteristic labels, step S640 and S660 can be executed (referring to step S140, S160, S440, S460 in aforesaid embodiments) in this case.

Figure 7:
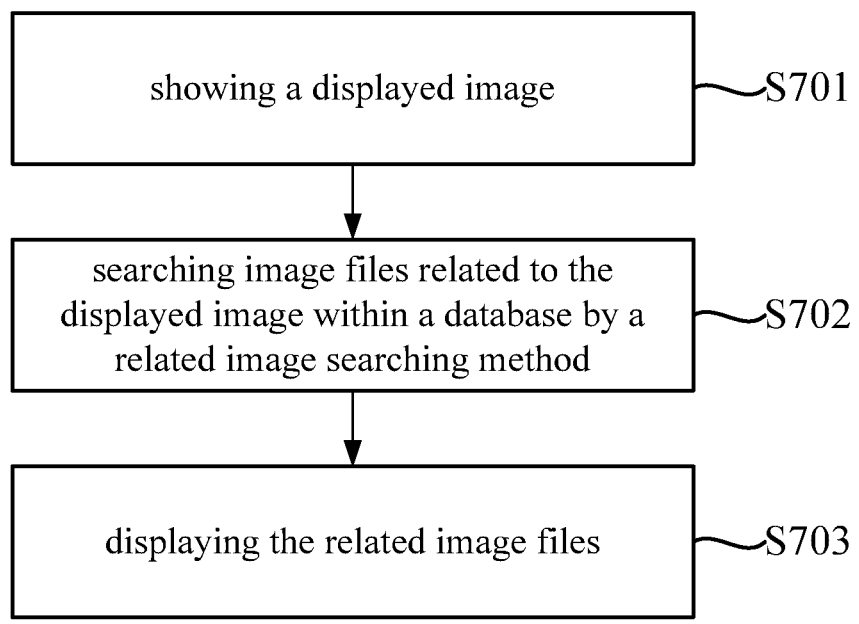
FIG. 7 is a flow diagram illustrating a user interface controlling method according to an embodiment of the disclosure.

In addition, reference is made to FIG. 7, which is a flow diagram illustrating a user interface controlling method according to an embodiment of the disclosure. As shown in FIG. 7, the user interface controlling method executes step S701 for showing a displayed image on a user interface. Afterward, step S702 is executed for searching other image files within a database by a related image searching method disclosed in aforesaid embodiments (referring to the related image searching method explained in aforesaid embodiments and illustrated in FIG. 1 to FIG. 6), so as to obtain image files related to the displayed image. Step S703 is executed for showing the image files in the searching result based on the related image searching method.

Based on aforesaid embodiments, users can assign/select contents of their interest by a touch gesture while viewing an image on the electronic device. In response, the electronic device immediately searches a database built in the electronic device and display related images within the database, so as to elevate the efficiency of the electronic device.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:
1. A related image searching method, suitable for searching a database storing a plurality of image files, the related image searching method comprising:
   selecting a context-of-interest (COI) area from a displayed image according to a touch input event;
   analyzing the COI area to identify a content characteristic in, wherein the content characteristic is related to a specific object;
   determining an implication attribute of the content characteristic, wherein the implication attribute includes an object category which the specific object belongs to; and
   searching the database according to the content characteristic and the implication attribute, so as to identify at least one image file from the database with the same content characteristic or the same implication attribute,
   wherein, during the step of selecting the context-of-interest (COI) area according to the touch input event, the touch input event comprise a plurality of touch points or a touch track, the related image searching method further comprises:
   selecting a first COI area and a second COI area together from the displayed image according to the touch points or the touch track of the touch input event;
   analyzing a first content characteristic in the first COI area and a second content characteristic in the second COI area;
   determining a first implication attribute of the first content characteristic and a second implication attribute of the second content characteristic; and
   searching the database according to a logical set formed by the first content characteristic, the first implication attribute, the second content characteristic and the second implication attribute, so as to identify at least one image file from the database with the same logical set.
2. The related image searching method of claim 1, further comprising:
   analyzing the image files within the database for obtaining a plurality of existed content characteristics of the image files;

establishing a plurality of existed content characteristic labels according to the existed content characteristics; and recording the existed content characteristic labels respectively corresponding to each of the image files, according to the existed content characteristics within each of the image files.

3. The related image searching method of claim 2, wherein, after the step of analyzing the content characteristic in the COI area, the related image searching method further comprises:

determining whether the content characteristic matches the existed content characteristics corresponding to the existed content characteristic labels; and if the content characteristic matches one of the existed content characteristics, searching the database according to corresponding one of the existed content characteristic labels, so as to identify at least one image file from the database with the same existed content characteristic label.

4. The related image searching method of claim 1, wherein the logical set is a conjunction set, a disjunction set or a complement set between the first content characteristic, the first implication attribute, the second content characteristic and the second implication attribute.

5. The related image searching method of claim 1, wherein the content characteristic is a specific person, a specific object, a specific location, a specific scene or a specific pet.

6. The related image searching method of claim 5, wherein the content characteristic is analyzed by an algorithm combination, and the algorithm combination is selected from the group consisting of a face recognition algorithm, an object recognition algorithm, a scene recognition algorithm and a pet recognition algorithm.

7. The related image searching method of claim 5, wherein the implication attribute determined from the content characteristic comprises at least one of a character category, an item category, a location category, a background category and a pet category.

8. The related image searching method of claim 1, wherein, during the step of searching the database according to the content characteristic and the implication attribute, the related image searching method further comprises:

preferentially searching at least one image file from the database with the same content characteristic; and if there is no image file found with the same content characteristic, searching at least one image file from the database with the same implication attribute.

9. A user interface controlling method, comprising:
showing a displayed image;
selecting a context-of-interest (COI) area from a displayed image according to a touch input event;
analyzing the COI area to identify a content characteristic in, wherein the content characteristic is related to a specific object;
determining an implication attribute of the content characteristic, wherein the implication attribute includes an object category which the specific object belongs to; and
searching a database storing a plurality of image files according to the content characteristic and the implication attribute, so as to identify at least one image file from the database with the same content characteristic or the same implication attribute;
displaying the at least one image file,
wherein, during the step of selecting the context-of-interest (COI) area according to the touch input event, the touch input event comprise a plurality of touch points or a touch track, the related image searching method further comprises:

selecting a first COI area and a second COI area together from the displayed image according to the touch points or the touch track of the touch input event;

analyzing a first content characteristic in the first COI area and a second content characteristic in the second COI area;

determining a first implication attribute of the first content characteristic and a second implication attribute of the second content characteristic; and searching the database according to a logical set formed by the first content characteristic, the first implication attribute, the second content characteristic and the second implication attribute, so as to identify at least one image file from the database with the same logical set.

10. The user interface controlling method of claim 9, further comprising:

analyzing the image files within the database for obtaining a plurality of existed content characteristics of the image files;

establishing a plurality of existed content characteristic labels; and recording the existed content characteristic labels respectively corresponding to each of the image files, according to the existed content characteristics within each of the image files.

11. The user interface controlling method of claim 10, wherein, after the step of analyzing the content characteristic in the COI area, the related image searching method further comprises:

determining whether the content characteristic matches the existed content characteristics corresponding to the existed content characteristic labels; and if the content characteristic matches one of the existed content characteristics, searching the database according to corresponding one of the existed content characteristic labels, so as to identify at least one image file from the database with the same existed content characteristic label.

12. The user interface controlling method of claim 9, wherein the logical set is a conjunction set, a disjunction set or a complement set between the first content characteristic, the first implication attribute, the second content characteristic and the second implication attribute.

13. The user interface controlling method of claim 9, wherein the content characteristic is a specific person, a specific object, a specific location, a specific scene or a specific pet.

14. The user interface controlling method of claim 13, wherein the content characteristic is analyzed by an algorithm combination, and the algorithm combination is selected from the group consisting of a face recognition algorithm, an object recognition algorithm, a scene recognition algorithm and a pet recognition algorithm.

15. The user interface controlling method of claim 13, wherein the implication attribute determined from the content characteristic comprises at least one of a character category, an item category, a location category, a background category and a pet category.

16. The user interface controlling method of claim 9, wherein, during the step of searching the database according to the content characteristic and the implication attribute, the related image searching method further comprises:

preferentially searching at least one image file from the database with the same content characteristic; and if there is no image file found with the same content characteristic, searching at least one image file from the database with the same implication attribute.

* * * * *